US010979590B2

(12) United States Patent
Tanaka (10) Patent No.: US 10,979,590 B2
(45) Date of Patent: Apr. 13, 2021

(54) IMAGE READING APPARATUS

(71) Applicant: CANON KABUSHIKI KAISHA, Tokyo (JP)

(72) Inventor: Shigeto Tanaka, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/739,775

(22) Filed: Jan. 10, 2020

(65) Prior Publication Data

US 2020/0236226 A1    Jul. 23, 2020

(30) Foreign Application Priority Data

Jan. 18, 2019    (JP) .............................. JP2019-006645

(51) Int. Cl.
*H04N 1/00* (2006.01)
*H04N 1/193* (2006.01)

(52) U.S. Cl.
CPC ....... *H04N 1/0083* (2013.01); *H04N 1/00018* (2013.01); *H04N 1/00893* (2013.01); *H04N 1/00899* (2013.01); *H04N 1/1936* (2013.01)

(58) Field of Classification Search
CPC ... H04N 2201/0001; H04N 2201/0082; H04N 2201/0091; H04N 5/05; H04N 5/2254; H04N 5/2351; H04N 5/2355; H04N 5/3575; H04N 5/3658; H04N 5/3675; H04N 5/36963; H04N 5/3698; H04N 5/374; H04N 5/3741; H04N 5/3742; H04N 5/37455; H04N 9/045; H04N 9/097; G06F 11/07; G06F 11/0721; G06F 11/0793; G06F 19/3418; G06F 19/3468; G06F 3/064; G06F 11/00; G06F 11/006; G06F 11/076; G06F 11/08; G06F 11/1004; G06F 11/1092; G06F 11/1438; G06F 11/1471; G06F 11/1629; G06F 11/3037; G06F 11/3058; G06F 11/3476; G06F 12/0246; G06F 12/0253; G06F 1/26; G06F 1/263; G06F 1/266; G06F 1/32; G06F 1/3203; G06F 1/3206; G06F 1/3209; G06F 1/3215; G06F 1/3228;
(Continued)

(56) References Cited

U.S. PATENT DOCUMENTS 10,122,880 B2 *  11/2018  Ninomiya ................ H02S 20/30
10,855,865 B2 *  12/2020  Yamazaki .......... H04N 1/00702
(Continued)

FOREIGN PATENT DOCUMENTS

JP      H06-14144       1/1994
JP      H09-211052      8/1997

*Primary Examiner* — Negussie Worku
(74) *Attorney, Agent, or Firm* — Venable LLP (57) ABSTRACT

Provided is an image reading apparatus including: an image reading unit configured to output image data representing an image read from an original; and an image control board configured to acquire the image data by controlling an operation of the image reading unit. When a shading error occurs, the image control board determines a part that has caused the shading error by determining whether or not a power supply voltage is being normally supplied to the image reading unit, determining whether or not a light source is normally emitting light, determining whether or not a memory is normally operating, and determining whether or not data output from the image reading unit is normally stored in the memory.

16 Claims, 8 Drawing Sheets

(58) Field of Classification Search
CPC ......... G06F 1/3296; G06F 2009/45587; G06F 2201/82; G06F 2201/86; G06F 3/0481; G06F 3/04847; G06F 3/0604; G06F 3/0619; G06F 3/0653; G06F 3/0659; G06F 3/0673; G06F 3/0683; G06F 3/1278; G06F 3/14
USPC .................................... 358/474, 1.14, 1.15
See application file for complete search history.

(56) References Cited

U.S. PATENT DOCUMENTS

| | | | |
|---|---|---|---|
| 2006/0193013 A1* | 8/2006 | Hoshi | H04N 1/00708 358/474 |
| 2013/0010338 A1* | 1/2013 | Tanaka | H04N 1/00795 358/475 |
| 2014/0365839 A1* | 12/2014 | Iwagami | G01R 31/318544 714/727 |
| 2017/0214816 A1* | 7/2017 | Yamakawa | H04N 1/00891 |
| 2018/0020108 A1* | 1/2018 | Nakayama | H04N 1/1235 |
| 2019/0112139 A1* | 4/2019 | Hirayama | H04N 1/00002 |
| 2019/0116284 A1* | 4/2019 | Yoshikaie | H04N 1/047 |
| 2019/0132478 A1* | 5/2019 | Mizutani | H04N 1/4052 |
| 2019/0163112 A1* | 5/2019 | Nikaku | G06T 7/73 |
| 2019/0166271 A1* | 5/2019 | Yamazaki | H04N 1/00236 |
| 2019/0202648 A1* | 7/2019 | Nakayama | B65H 7/14 |
| 2019/0273836 A1* | 9/2019 | Akagi | H04N 1/02885 |
| 2020/0145542 A1* | 5/2020 | Obata | H04N 1/00055 |
| 2020/0220984 A1* | 7/2020 | Aizono | H04N 1/00689 |
| 2020/0301326 A1* | 9/2020 | Yamazaki | G03G 15/6573 |

* cited by examiner

| ADDRESS | STORED DATA |
|---------|-------------|
| 1023 | 8 |
| 1022 | 8 |
| 1021 | 8 |
| 1020 | 8 |
| 1019 | 8 |
| 1018 | 8 |
| ⋮ | |
| 4 | 8 |
| 3 | 8 |
| 2 | 8 |
| 1 | 8 |
| 0 | 8 |

IMAGE READING APPARATUS

BACKGROUND OF THE INVENTION

Field of the Invention

The present disclosure relates to a technology for detecting a failed part in an image reading apparatus configured to read an image from an original.

Description of the Related Art

An image reading apparatus includes an image reading unit configured to read an image from an original, and an image controller configured to control an operation of the image reading unit. The image reading apparatus performs shading correction for suppressing the unevenness of the read image when power is turned on or when image reading processing is started. The image reading apparatus can also examine whether or not the image reading processing can be normally performed at the time of the shading correction. When the image reading processing cannot be normally performed, it is required to identify and replace a failed part that has caused such a failure.

In Japanese Patent Application Laid-Open No. Hei 6-14144, there is disclosed a self-diagnosis system configured to diagnose an occurrence of an abnormality for each of a plurality of boards forming an image controller through self-diagnosis without using a special pattern generator. This self-diagnosis system can identify a failed board from the plurality of boards forming the image controller.

The image reading unit and the image controller are connected to each other by, for example, a flexible flat cable (hereinafter referred to as "FFC") to perform communication to/from each other. When reading an image from an original placed on an original table, the image reading unit performs a reading operation while being moved. The FFC is generally formed by bundling a plurality of signal lines into one cable, and is therefore suitable for connection between the movable image reading unit and the image controller. In the FFC, a signal line at its end portion in the width direction may be broken when a stress is applied to the end portion in the width direction due to contact with, for example, a surrounding sheet metal. The break in the FFC may cause a communication failure between the image reading unit and the image controller, to thereby inhibit the image reading processing from being performed. Therefore, it is required to promptly detect a break in the FFC. In an FFC disclosed in Japanese Patent Application Laid-Open No. Hei 9-211052, signal lines for detecting a break are provided at both ends in the width direction. A break in the FFC is detected by examining the electrical connection state of each of the signal lines.

With the self-diagnosis system disclosed in Japanese Patent Application Laid-Open No. Hei 6-14144, it is possible to identify a failed part inside the image controller, but it is not taken into consideration to identify a failure in the image reading unit or a break in the FFC as the cause of an abnormality. The image reading unit includes different parts, for example, an image reading sensor for reading an image, a light source configured to irradiate an original with light, and a board on which an analog front-end and a driver which are configured to control the image reading sensor and the light source are implemented. When the image reading processing cannot be normally performed, it is required to determine a failure in those components. When the failed part cannot be identified, it takes much time for a service person to identify and repair the failed part, replace the failed part with a new part, and perform other such work.

The signal lines at both widthwise ends of the FFC disclosed in Japanese Patent Application Laid-Open No. Hei 9-211052 are dedicated lines for diagnosing the connection state, and other various signals are not transmitted through those signal lines. However, even when it is determined that a break has occurred in the FFC based on the signal lines, the image reading processing is not affected unless a break has occurred in a signal line used for actual signal transmission. In this case, even when an abnormality occurs in the image reading processing due to another factor, the FFC is replaced, while the abnormal state of the image reading processing is left unsolved.

There is another case in which, even when it is determined that the connection state of the FFC is normal, a break may occur in a signal line for transmitting an actual signal required for image reading. For example, when the FFC is stored in a packed state, a stress may continue to be applied to an inner signal line of the FFC for a long period of time. This may cause a crease and a break in the inner signal line of the FFC. In another case, a crease or a flaw may occur in the inner signal line of the FFC due to contact with a sheet metal or another such member at the time of mounting, and a break may occur in the signal line at the crease or the flawed spot due to repetitive sliding during the subsequent image reading processing. Such a break causes a communication failure between the image controller and the image reading unit, and causes an abnormal state of the image reading processing. The break in the inner signal line of the FFC cannot be detected by the technology disclosed in Japanese Patent Application Laid-Open No. Hei 9-211052. Therefore, it takes much time for the service person to determine the presence or absence of a break in the FFC and replace the FFC.

SUMMARY OF THE INVENTION

An image reading apparatus according to the present disclosure includes an image reading unit configured to read an image from an original to generate image data representing the read image; and an image control unit configured to acquire the image data from the image reading unit, wherein the image reading unit includes: a light emitter configured to irradiate the original with light; and a light receiver configured to receive reflected light of the light from the original, to thereby read the image, wherein the image control unit includes: a controller configured to control an operation of the image reading unit; and a memory configured to store the image data acquired from the image reading unit, and wherein, when there occurs an error, which indicates that the operation of the image reading unit is unable to be appropriately operated, the controller is configured to determine a part that has caused the error by: determining whether a power supply voltage is being normally supplied to the image reading unit; determining whether the light emitter is normally emitting light; determining whether the memory is normally operating; and determining whether data output from the image reading unit is normally stored in the memory.

Further features of the present invention will become apparent from the following description of exemplary embodiments (with reference to the attached drawings).

DESCRIPTION OF THE EMBODIMENTS

Figure 1:
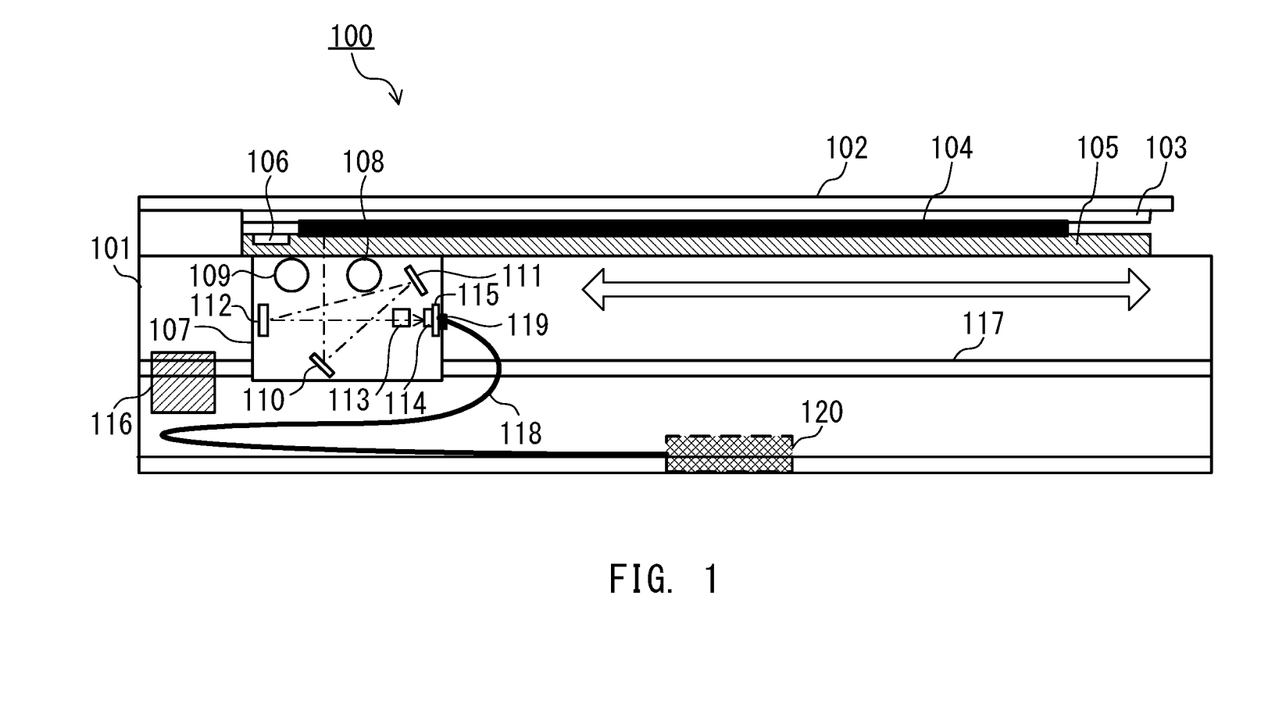
FIG. 1 is an explanatory view of a configuration of an image reading apparatus according to at least one embodiment of the present disclosure.

Embodiments of the present disclosure are described below in detail with reference to the drawings.
Configuration of Image Reading Apparatus FIG. 1 is an explanatory view of a configuration of an image reading apparatus according to at least one embodiment of the present disclosure. An image reading apparatus 100 includes, in the upper part of a housing 101, an original table glass 105, on which an original 104 is to be placed, and a holding plate 102, to which a white pressure plate 103 is mounted. The original table glass 105 is provided with a white reference plate 106 serving as a white reference to be used at the time of shading correction. The holding plate 102 is mounted to the housing 101 so as to be openable and closable with respect to the original table glass 105. The original 104 is placed so that its surface to be read faces downward (toward the original table glass 105). The original 104 is pressed against the original table glass 105 when the holding plate 102 is closed. The white pressure plate 103 reflects light transmitted through the original 104 when the image of the original 104 is read, to thereby prevent the underlying portion of the original 104 from being exposed.

The housing 101 includes, in its inside, an image reading unit 107 for reading an image from the original 104. A conveyance shaft 117 is provided inside the housing 101 in order to move the image reading unit 107 in the left-right direction of FIG. 1. The image reading unit 107 is moved in the left-right direction of FIG. 1 by being moved on the conveyance shaft 117 by a driving force output from a conveyance motor 116 provided outside the housing 101. The moving direction of the image reading unit 107 (direction in which the conveyance shaft 117 extends) corresponds to a sub-scanning direction in which the image is to be read. The image reading unit 107 reads the image of the original 104 placed on the original table glass 105 while being moved in the sub-scanning direction, to generate image data representing the read image.

The image reading unit 107 includes light sources 108 and 109, a first mirror 110, a second mirror 111, a third mirror 112, an imaging lens 113, an image reading sensor 114, and an image reading board 115. The light sources 108 and 109 are each a light emitter, which is formed of light emitting elements, for example, light emitting diodes (LEDs), and is configured to irradiate the original 104 placed on the original table glass 105 with light. The first mirror 110, the second mirror 111, the third mirror 112, and the imaging lens 113 form an optical system configured to form an image of light reflected by the original 104 on the light receiving surface of the image reading sensor 114. The image reading sensor 114 is a light receiver in which a plurality of photoelectric conversion elements are arranged in the depth direction of FIG. 1. The image reading sensor 114 is formed of, for example, a complementary metal oxide semiconductor (CMOS) line sensor or a contact image sensor (CIS). The direction in which the photoelectric conversion elements are arranged corresponds to a main scanning direction in which the image is to be read. The image reading sensor 114 is implemented on the image reading board 115.

When reading the image of the original 104, the image reading unit 107 irradiates the original 104 with light from the light sources 108 and 109. The applied light is reflected by the original 104, and the reflected light is received by the image reading sensor 114. The image reading sensor 114 outputs an analog signal having a voltage level corresponding to the amount of received reflected light. For example, the voltage level of the analog signal becomes higher as the amount of received reflected light becomes larger. When the reflected light is not being received, the image reading sensor 114 outputs an analog signal having a voltage level lower than that when the reflected light is being received. The image reading board 115 generates image data representing the read image by converting the analog signal output from the image reading sensor 114 into a digital signal. The image reading unit 107 performs the above-mentioned image reading processing while being moved in the sub-scanning direction, to thereby read the image of the original 104 line by line to generate image data line by line.

The shading correction of the image reading unit 107 is described. As described above, the image reading sensor 114 is formed by arranging a plurality of photoelectric conversion elements in the main scanning direction. The photoelectric conversion elements have variations in reading sensitivity for each element (each pixel) configured to receive reflected light. Therefore, the read image is influenced by the variations in reading sensitivity. This influence causes, for example, a difference in level of a luminance value being a reading result between each pair of adjacent pixels.

The light sources 108 and 109 are required to uniformly irradiate the surface of the original 104 to be read with light. However, when light is not uniformly applied, an image having an uneven light distribution is read. When the optical system is, for example, a reduction optical system, an angle difference occurs between its central portion and its end portion. Therefore, a light amount difference, a chromatic aberration, and other such optical differences occur in the reflected light received by the image reading sensor 114.

For example, even when a member having the same density is read, variations occur in the voltage level of the analog signal being a reading result output from each of pixels of the image reading sensor 114 due to the above-mentioned characteristics of the image reading unit 107. The white reference plate 106 provided to the original table glass 105 is a white member having a uniform density. By causing the image reading unit 107 to read the white reference plate 106, it is possible to correct the variations in the voltage level of the analog signal of each pixel of the image reading sensor 114. This correction processing is the shading correction.

Prior to the reading of the image of the original 104, the image reading apparatus 100 moves the image reading unit 107 to a position directly below the white reference plate 106, and causes the image reading unit 107 to read the white reference plate 106. The image reading apparatus 100 detects the amount of variations in the voltage level of the analog signal of each pixel from a result of reading the white reference plate 106. The image reading apparatus 100 generates, from the detected amount of variations, such a correction value as to achieve a predetermined value as the voltage level of the analog signal of each pixel to be obtained when the white reference plate 106 is read. The image reading apparatus 100 performs the shading correction using this correction value, to thereby be able to generate image data in which the influence of the variations in the voltage level of the analog signal of each pixel is suppressed.

The image reading board 115 of the image reading unit 107 includes a connector 119. The connector 119 is connected to one end portion of a flexible flat cable (FFC 118) formed by combining a plurality of signal lines into one. The other end portion of the FFC 118 is connected to a connector of an image control board, which is provided outside the casing 101, through a casing hole 120 formed in the casing 101. The image control board is described later. The image reading unit 107 transmits the image data generated by reading the image of the original 104 to the image control board through the FFC 118. The FFC 118 slides inside the housing 101 when the image reading unit 107 moves in the sub-scanning direction at the time of reading the image of the original 104.

Figure 2:
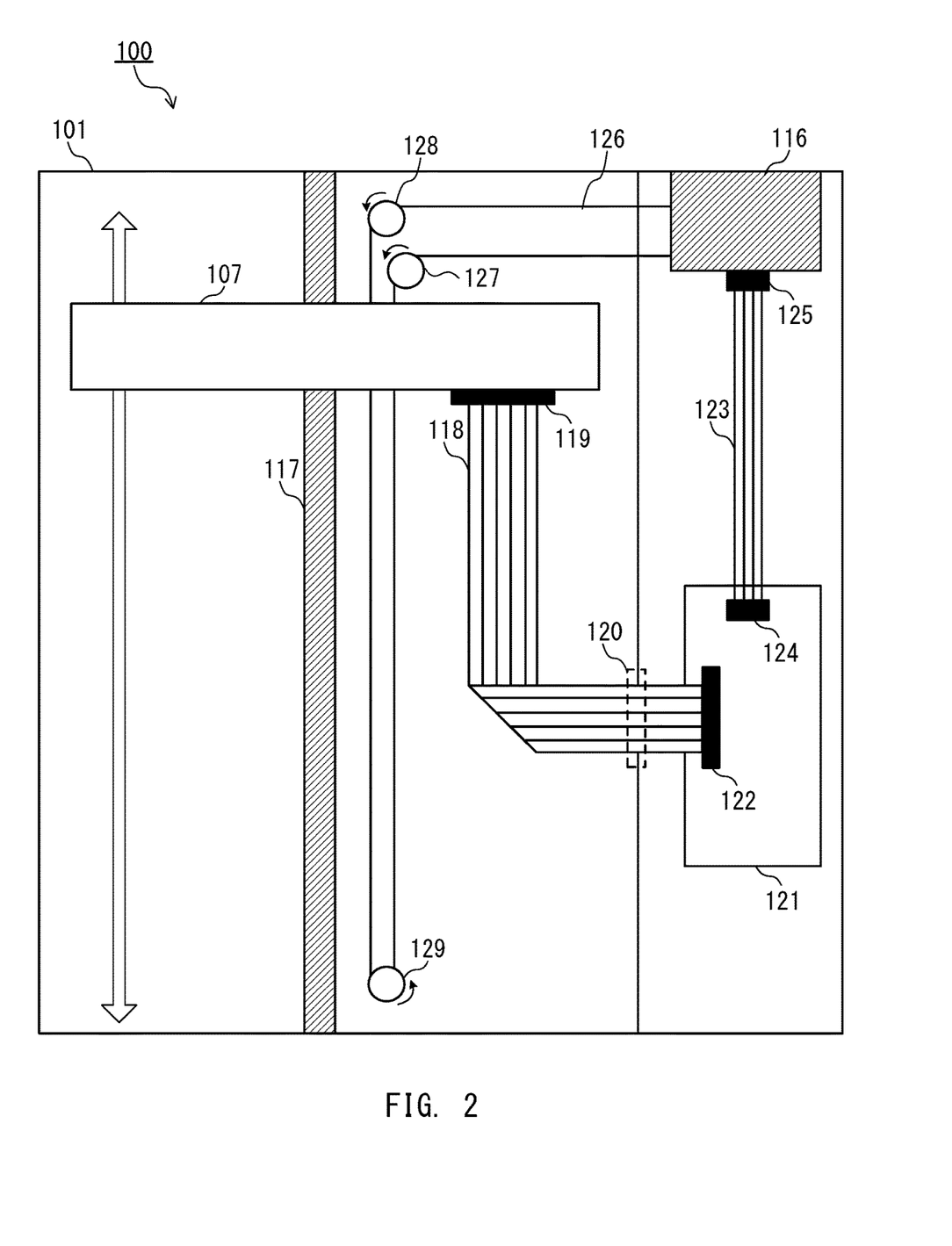
FIG. 2 is an explanatory view from an original table glass side of the image reading apparatus.

FIG. 2 is an explanatory view from the original table glass 105 side (upper side in FIG. 1) of the image reading apparatus 100. The FFC 118 is arranged so as to extend from the connector 119 along the bottom surface of the inside of the housing 101 in a direction from the top toward the bottom (in the sub-scanning direction) in FIG. 2 in such a manner as to be folded back by 90 degrees and pass through the housing hole 120 to be connected to a connector 122 of an image control board 121. The image control board 121 also controls an operation of the conveyance motor 116 for conveying the image reading unit 107 in the sub-scanning direction. For that purpose, the image control board 121 includes a connector 124, while the conveyance motor 116 includes a connector 125. The connector 124 and the connector 125 are connected to each other by bundled wires 123. The image control board 121 transmits a control signal for controlling the operation of the conveyance motor 116 to the conveyance motor 116 through the bundled wires 123.

In order to move the image reading unit 107 in the sub-scanning direction, a driving belt 126 and driving gears 127, 128, and 129 are provided inside the housing 101. The driving belt 126 is mounted to a drive shaft of the conveyance motor 116, and is wound around the driving gears 127, 128, and 129. The image reading unit 107 is mounted to the driving belt 126 by a fixture (not shown). With such a configuration, when the conveyance motor 116 is rotated, a driving force thereof is transmitted to the driving belt 126. The driving belt 126 is rotated by the driving force in accordance with the arrangement of the driving gears 127, 128, and 129. The driving gears 127 and 128 are provided at positions spaced apart from the position of the driving gear 129 in the sub-scanning direction. Therefore, the image reading unit 107 is moved in the sub-scanning direction by the rotation of the driving belt 126.

The movement of the image reading unit 107 causes the FFC 118 to slide and change the bent state of the cable. When there is a break in the FFC 118, the FFC 118 may be in a conductive state at a predetermined position during the sliding, and may be in a non-conductive state at another position. For example, when bent at the broken spot, the FFC 118 is brought into a non-conductive state at the broken spot, and when not bent, the FFC 118 is brought into a conductive state at the broken spot. Therefore, it is required to constantly examine whether or not a break has occurred in the FFC 118 during the sliding of the FFC 118.

Controller Unit

Figure 3:
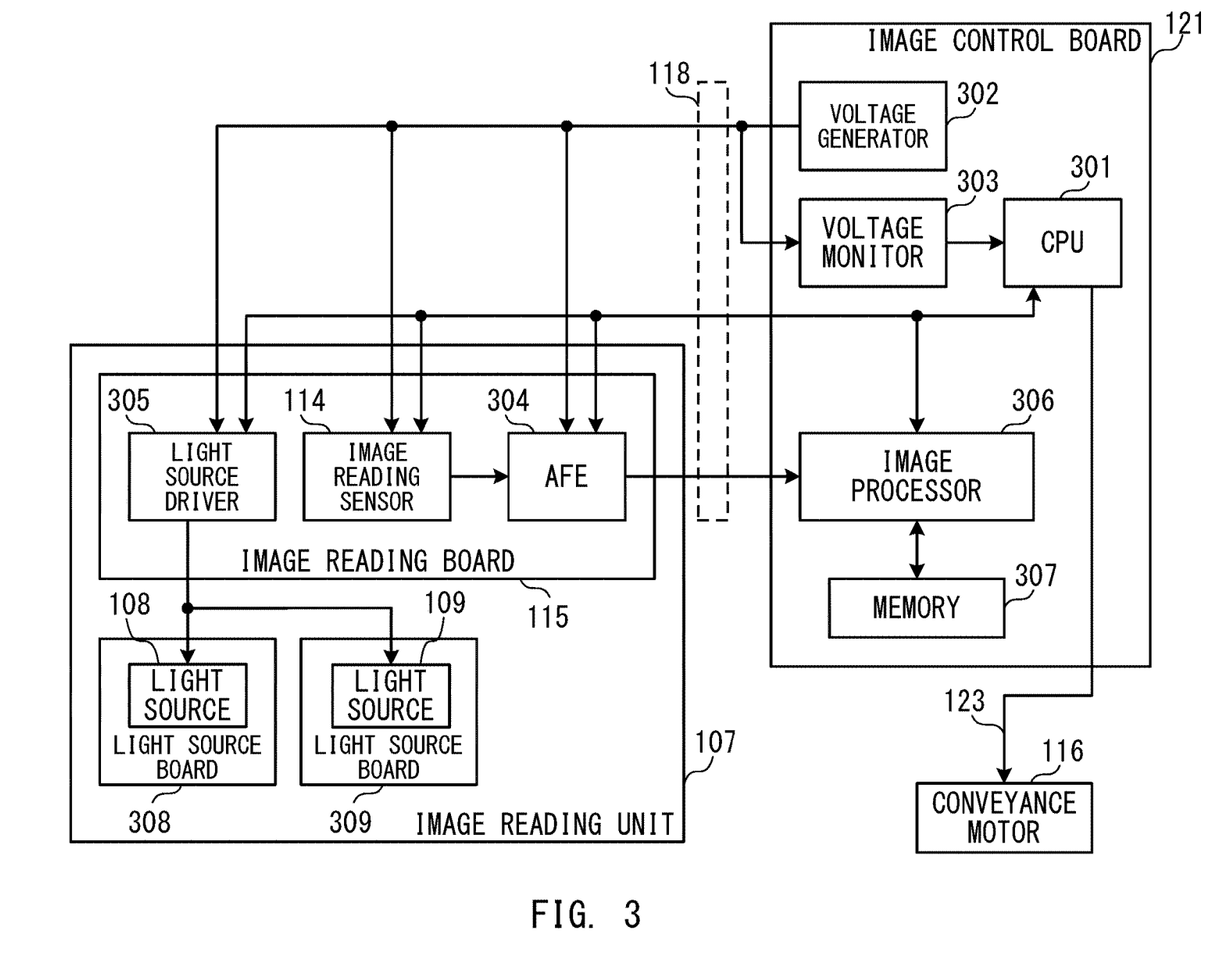
FIG. 3 is an explanatory diagram of configurations of an image reading unit and an image control board.

FIG. 3 is an explanatory diagram of configurations of the image reading unit 107 and the image control board 121.

The image control board 121 includes a central processing unit (CPU) 301, a voltage generator 302, a voltage monitor 303, an image processor 306, and a memory 307. The CPU 301 is a control device configured to control an operation of the image reading apparatus 100 by executing a predetermined control program. The CPU 301 controls the operation by transmitting various control signals to the image reading unit 107 and the conveyance motor 116 during the shading correction and the image reading processing. The voltage monitor 303 and the image processor 306 may have their functions implemented by hardware, or may have their functions implemented by software by the CPU 301 executing the control program.

The voltage generator 302 generates a DC voltage, which is a power supply voltage for driving the image reading unit 107, and supplies the DC voltage to the image reading unit 107. The DC voltage generated by the voltage generator 302 is also supplied to the voltage monitor 303. The voltage monitor 303 monitors whether or not the voltage value of the DC voltage supplied from the voltage generator 302 has a predetermined voltage level. The voltage monitor 303 transmits a result of the monitoring to the CPU 301. The CPU 301 can determine a failed state of the voltage generator 302 based on the result of the monitoring.

The image processor 306 performs predetermined image processing on the image data acquired from the image reading unit 107. The image processor 306 transmits the image data subjected to the image processing to an image forming apparatus, a personal computer, or other such external apparatus as a result of reading the original 104. The image processor 306 stores, in the memory 307, the image data that has been acquired from the image reading unit 107 but has not been subjected to the image processing yet. The image processor 306 performs shading correction based on the image data generated by reading the white reference plate 106, and stores a correction value in the memory 307.

The image reading unit 107 includes an image reading board 115 and light source boards 308 and 309. A light source driver 305, the image reading sensor 114, and an analog front-end (AFE 304) are implemented on the image reading board 115. The light source driver 305, the image reading sensor 114, and the AFE 304, which are implemented on the image reading board 115, are operated by the DC voltage supplied from the voltage generator 302, and have the operations controlled based on various control signals transmitted from the CPU 301. The light source 108 is implemented on the light source board 308. The light source 109 is implemented on the light source board 309.

The light source driver 305 supplies a current for light emission to the light source 108 of the light source board 308 and the light source 109 of the light source board 309. The light source driver 305 controls whether to turn on or off the light sources 108 and 109. As described above, the image reading sensor 114 outputs an analog signal having a voltage level corresponding to the amount of received reflected light. The analog signal is input to the AFE 304. The AFE 304 converts the analog signal into a digital signal to generate image data. The AFE 304 transmits the generated image data to the image processor 306. The image data is a digital signal, to thereby suppress the influence of a decrease in voltage level due to the internal resistance of the FFC 118.

In this manner, the DC voltage is supplied from the image control board 121 to the image reading unit 107 through the FFC 118, and the control signal is transmitted. The image data is transmitted from the image reading unit 107 to the image control board 121 through the FFC 118.

When the above-mentioned shading correction is performed, the image control board 121 moves the image reading unit 107 to the position directly below the white reference plate 106 by the conveyance motor 116. The image reading unit 107 irradiates the white reference plate 106 by the light sources 108 and 109, and receives the reflected light by the image reading sensor 114. The AFE 304 converts the analog signal, which is obtained as a result of reading the white reference plate 106 into digital image data, and transmits the digital image data to the image processor 306. The image processor 306 generates a correction value for a gain so as to suppress variations in image data of each pixel. The image processor 306 performs gain correction corresponding to the generated correction value.

In the shading correction, the image data generated by reading the white reference plate 106 is stored in the memory 307. When the value (for example, luminance value) of each pixel represented by the image data is smaller than a predetermined value, the CPU 301 determines that it is difficult to adjust the read image by shading correction. In this case, the CPU 301 determines that a correction error (shading error) indicating that appropriate correction cannot be performed by the shading correction has occurred in the image reading unit 107. When a shading error occurs, the image reading apparatus 100 stops the image reading processing, and performs processing for identifying a part (failed part) that has caused the shading error.

Specifically, in the shading correction, it is required to increase the gain for pixels having small image data values. In the gain correction, noise components included in the image data output from the image reading unit 107 are amplified in the same manner. The amplification of the noise components is a factor that causes a decrease in image quality of the read image. Therefore, the correction value for performing the gain correction is preferred to be set to be as small as possible. When the correction value is required to be set so that the gain is equal to or larger than the predetermined value, the image reading apparatus 100 determines that a shading error has occurred.

Meanwhile, the image processor 306 acquires the image data from the AFE 304 through the FFC 118. The image processor 306 compares the image data subjected to the image processing with a predetermined expected value, and detects a break in the FFC 118 based on a result of the comparison.

With the above-mentioned configuration, when an instruction to perform the image reading processing is given, the CPU 301 moves the image reading unit 107 to the position directly below the white reference plate 106 by the conveyance motor 116, and causes the image reading unit 107 to read the white reference plate 106. The image data representing a result of reading the white reference plate 106 is transmitted from the AFE 304 to the image processor 306. The image processor 306 performs the shading correction based on the acquired image data. When the shading correction is finished, the CPU 301 causes the image reading unit 107 to read the image of the original 104 placed on the original table glass 105 while moving the image reading unit 107 in the sub-scanning direction by the conveyance motor 116. The image data representing a result of reading the image of the original 104 is transmitted from the AFE 304 to the image processor 306. The image processor 306 performs predetermined image processing on the acquired image data. The image reading processing is performed in this manner.

Identification of a Failed Part at the Time of Shading Error

Figure 4:
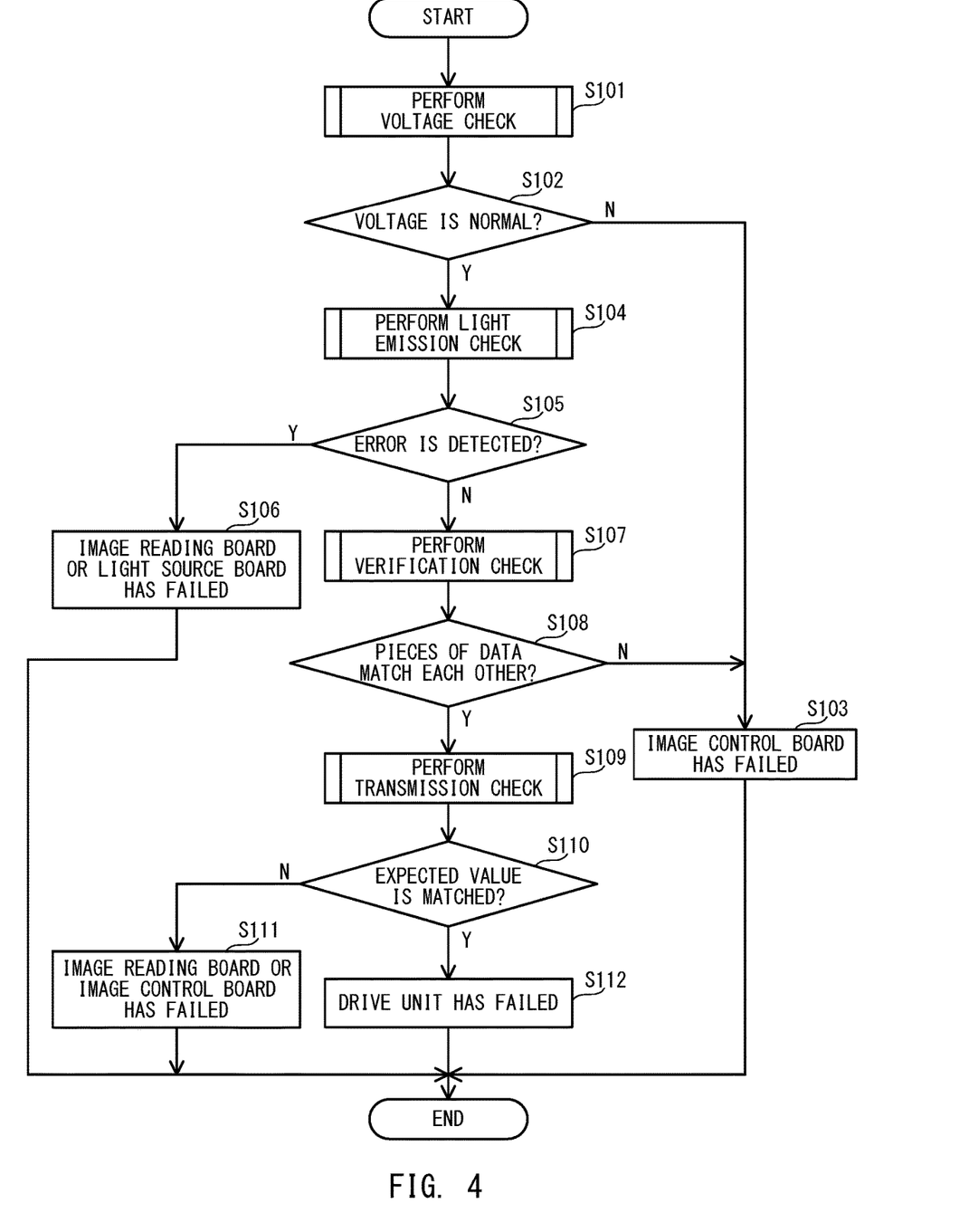
FIG. 4 is a flow chart for illustrating failed part identification processing.

FIG. 4 is a flow chart for illustrating failed part identification processing to be performed when a shading error occurs. The image reading apparatus 100 according to at least one embodiment identifies a failed part by performing a DC voltage check (Step S101), a light emission check of the light sources 108 and 109 (Step S104), a verification check of the memory 307 (Step S107), and a transmission check of the image data (Step S109) in the stated order.

The DC voltage check in Step S101 is performed by the voltage monitor 303. The image control board 121 supplies a DC voltage from the voltage generator 302 to the image reading board 115. The voltage monitor 303 acquires the DC voltage output from the voltage generator 302, and compares the DC voltage with a predetermined voltage level serving as a reference. The CPU 301 performs a voltage check for determining whether or not the DC voltage is at a normal voltage level based on the result of the comparison. When the voltage level of the DC voltage is not normal as a result of the voltage check ("N" in Step S102), the CPU 301 determines that an abnormality has occurred in the voltage generator 302. In this case, the CPU 301 determines that the image control board 121, on which the voltage generator 302 is implemented, has failed (Step S103). The CPU 301 issues a notification for prompting the replacement of the image control board 121.

When the voltage level of the DC voltage is normal as a result of the voltage check ("Y" in Step S102), the CPU 301 performs a light emission check.

The light emission check of the light sources 108 and 109 in Step S104 is performed by a light load error check of the light source driver 305. The light load error check is performed in the following manner. The light source driver 305 controls the light emission of the light sources 108 and 109 by supplying a current to the light sources 108 and 109 based on a control signal acquired from the CPU 301. The image reading board 115, on which the light source driver 305 is implemented, and the light source boards 308 and 309, on which the light sources 108 and 109 are implemented, are connected to each other by bundled wires for supplying current. The light source driver 305 includes a built-in current detection circuit.

When the current is not being supplied to the light sources 108 and 109 due to, for example, the disconnection of the bundled wires or the break in the bundled wires, the light source driver 305 enters a light load state, and detects a light load error by the current detection circuit. The CPU 301 acquires an examination result as to whether or not a light load error has been detected from the light source driver 305 through the FFC 118. The CPU 301 performs, based on the examination result, the light emission check for examining whether or not a current is being supplied to the light sources 108 and 109 to emit light.

When a light load error is detected ("Y" in Step S105), the CPU 301 determines that no light is emitted from the light sources 108 and 109. In this case, the CPU 301 determines that the image reading board 115 or the light source board 308 or 309 involved in the light emission of the light source 108 or 109 has failed (Step S106). The CPU 301 issues a notification for prompting the replacement of the image reading board 115 or the light source boards 308 and 309.

When no light load error is detected ("N" in Step S105), the CPU 301 determines that the light sources 108 and 109 are emitting light, and performs a verification check of the memory 307.

The verification check of the memory 307 in Step S107 is performed by verifying a match between data written to the memory 307 and data read from the memory 307. The memory 307 is used for storing the image data at the time of the shading correction. Therefore, the memory 307 causes a shading error when the memory 307 is not normally operating due to, for example, an electrical failure.

The CPU 301 writes predetermined data to a specific storage area (address) of the memory 307, and after the writing, reads the data from the specific storage area (address) of the memory 307. The CPU 301 performs the verification check by comparing the written data with the read data and verifying whether or not the written data and the read data match each other. When the written data and the read data do not match each other as a result of the verification check ("N" in Step S108), the CPU 301 determines that the memory 307 has failed. In this case, the CPU 301 determines that the image control board 121, on which the memory 307 is implemented, has failed (Step S103). The CPU 301 issues a notification for prompting the replacement of the image control board 121.

When the written data and the read data match each other as a result of the verification check ("Y" in Step S108), the CPU 301 performs a transmission check of the image data.

The transmission check of the image data in Step S109 is performed using PG data generated by the AFE 304 as image data. CPU 301 sets a register setting for the AFE 304, thus, the AFE 304 can output the PG data. The PG data is image data formed of a predetermined fixed value or an increment pattern in which a value is changed by one every clock. The AFE 304 stores the generated PG data in the memory 307 through the intermediation of the image processor 306. The CPU 301 reads the stored PG data, and verifies whether or not the read PG data matches an expected value, to thereby be able to examine whether or not the transmission of the image data is being normally performed.

When the read PG data matches the expected value ("Y" in Step S110), the CPU 301 determines that the image data is being normally transferred. The CPU 301 determines that there is no problem in signal transmission/reception based on a result of this determination, and determines that a drive unit for moving the image reading unit 107 in the sub-scanning direction has failed (Step S112). The drive unit includes the conveyance motor 116, the bundled wires 123, the driving belt 126, and the driving gears 127, 128, and 129. The CPU 301 issues a notification for prompting the replacement of the drive unit.

When the read PG data does not match the expected value ("N" in Step S110), the CPU 301 determines that the image data is not being normally transmitted/received. The CPU 301 has already determined in the processing of Step S107 that the operation of the memory 307 is normal, and hence the CPU 301 determines that a part for storing data from the AFE 304 to the memory 307 has failed. In this case, the CPU 301 determines that the image reading board 115 or the image control board 121 has failed (Step S111). The CPU 301 issues a notification for prompting the replacement of the image reading board 115 or the image control board 121.

Figure 5:
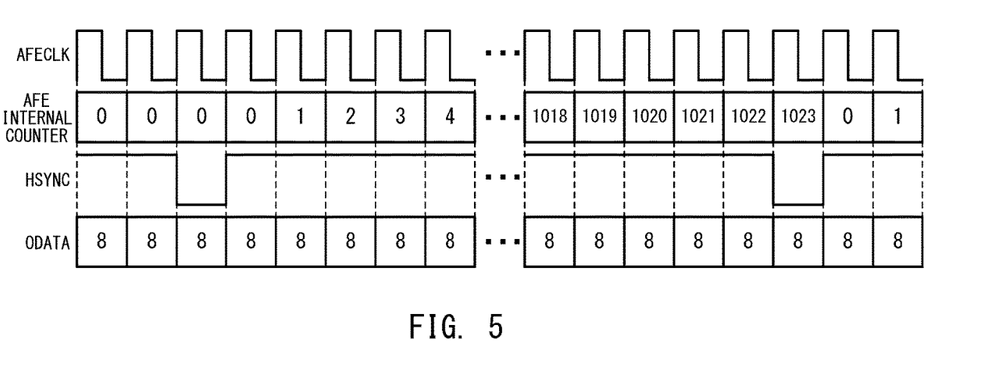
FIG. 5 is an explanatory diagram of PG data.

FIG. 5 is an explanatory diagram of the PG data output from the AFE 304. In this PG data, each pixel is set to a fixed value "8". The image data is transmitted to the image control board 121 for each pixel in synchronization with a clock signal (AFECLK) generated by the AFE 304. In this case, the AFE 304 transmits the fixed value "8" as image data (ODATA) of each pixel.

Figure 6:
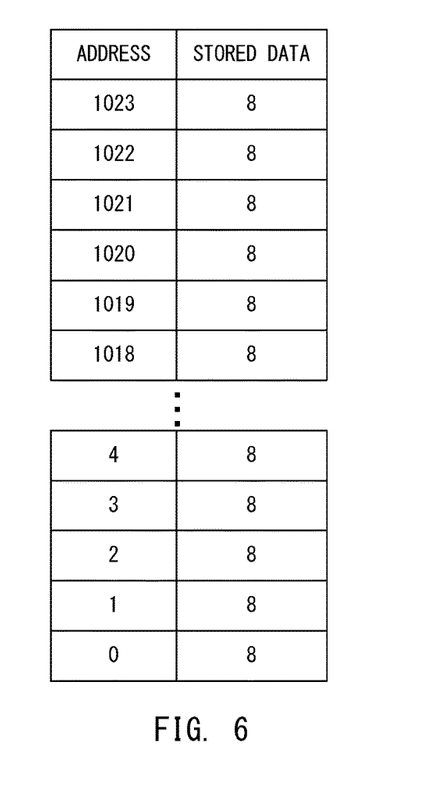
FIG. 6 is an explanatory diagram of the PG data stored in a memory.

FIG. 6 is an explanatory diagram of the PG data stored in the memory 307. FIG. 6 exemplifies a state in which the PG data (fixed value "8") illustrated in FIG. 5 is stored in the memory 307. The AFE 304 transmits the image data to the image processor 306 in synchronization with a main scanning synchronization signal. The image processor 306 stores the image data corresponding to one line in the main scanning direction in a predetermined storage area (addresses 0 to 1023) of the memory 307 in synchronization with a horizontal synchronization signal (HSYNC) in order from the head pixel. The image processor 306 stores the fixed value "8" at the addresses 0 to 1023 of the memory 307 based on the image data having the fixed value "8".

Figure 7:
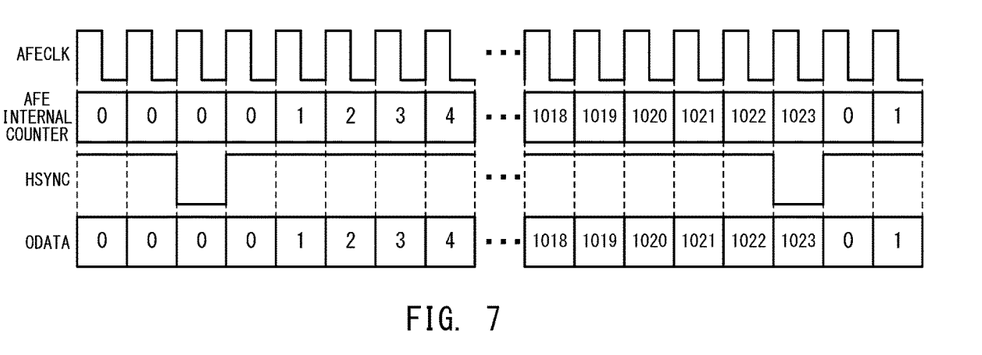
FIG. 7 is an explanatory diagram of the PG data.

FIG. 7 is an explanatory diagram of the PG data output from the AFE 304. In this PG data, each pixel is set to a value incremented by one. The AFE 304 transmits the image data to the image control board 121 for each pixel in synchronization with the clock signal (AFECLK). In this case, the AFE 304 transmits the value incremented by one for each pixel as the image data (ODATA). In at least one embodiment, the value of each pixel is changed from 0 to 1023.

Figure 8:
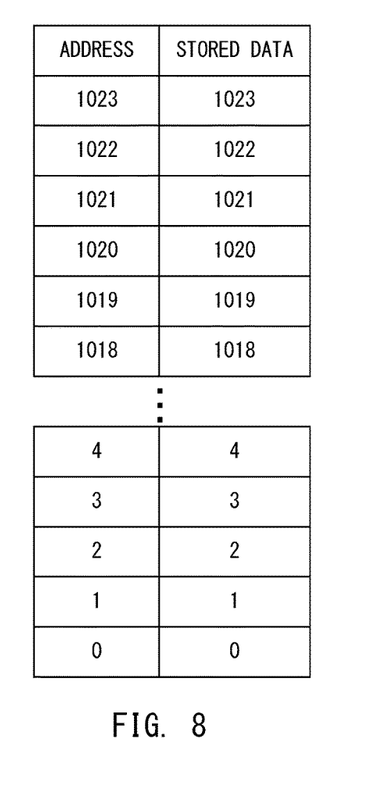
FIG. 8 is an explanatory diagram of the PG data stored in the memory.

FIG. 8 is an explanatory diagram of the PG data stored in the memory 307. FIG. 8 exemplifies a state in which the PG data illustrated in FIG. 7 (value incremented by one for each pixel) is stored in the memory 307. The image processor 306 stores image data in an order of the address. The image processor 306 stores an image data piece n at an address n (where n ranges from 0 to 1023).

As illustrated in FIG. 6 and FIG. 8, when image data (PG data) having a predetermined test pattern is output from the AFE 304, the expected value of data to be stored at each address of the memory 307 is obvious. Therefore, the CPU 301 compares the PG data stored in the memory 307 with the expected value, to thereby be able to determine whether or not the image data (PG data) is being normally transmitted and whether or not a break has occurred in the FFC 118.

The PG data may be subjected to processing in which 1) the PG data is written to a predetermined storage area (address) of the memory 307 a predetermined number of times and 2) the PG data is then read from the predetermined storage area (address). After the above processing, the PG data is compared with the expected value after being repeatedly, namely, a plurality of times. In a case where the PG data is data in which the data thereof is changed bit by bit, all the pieces of PG data may be read and compared with the expected value at a time point when the continuous transfer from the AFE 304 to the image control board 121 is finished. The PG data and its verification method may be any method that allows the expected value to be uniquely determined.

This brings the failed part identification processing for the occurrence of a shading error to an end. As described above, in at least one embodiment, the failed part is identified by performing the DC voltage check, the light emission check of the light sources 108 and 109, the verification check of the memory 307, and the transmission check of the image data in the stated order. In the failed part identification processing, the failed part is efficiently identified by examining the operations of the parts for generating image data in order from the upstream side of the processing for generating the image data. However, the failed part may be identified in an order different from that in at least one embodiment, for example, by first performing the transmission check of the image data through use of the PG data and then performing the verification check of the memory 307.

As described above, when a shading error occurs, the image reading apparatus 100 according to at least one embodiment can quickly identify the failed part that caused the shading error. This allows the service person to efficiently identify and repair the failed part, replace the failed part with a new part, and perform other such work in a short period of time.

Detection of a Break in the FFC

Figure 9:
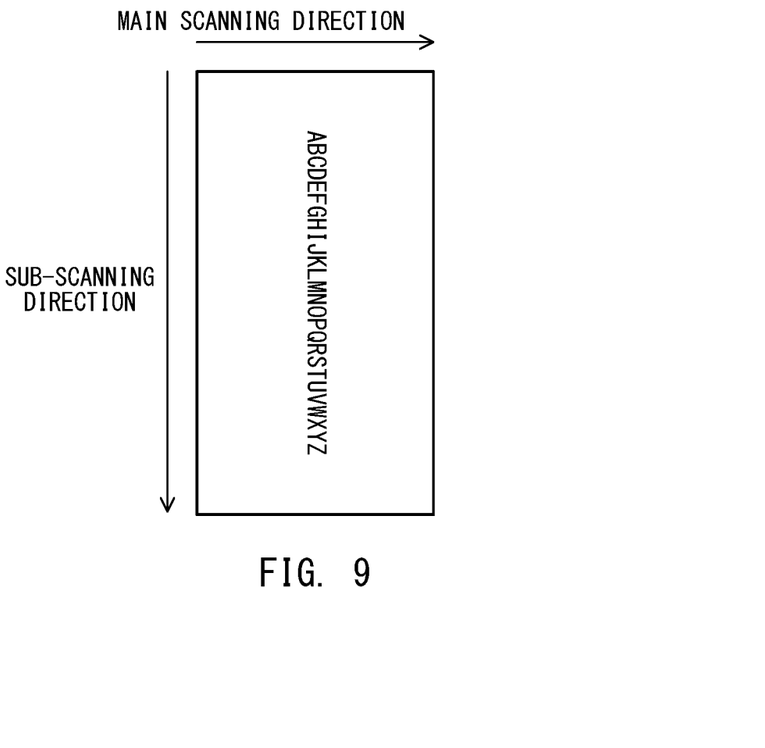
FIG. 9 is a view for illustrating an example of an image represented by image data.

FIG. 9 is a view for illustrating an example of an image represented by the image data transmitted through the FFC 118 in a normally conductive state. The image data transmitted through the FFC 118 is a digital signal, and hence the image data is transmitted from the image reading unit 107 to the image control board 121 without deterioration when no break has occurred in the FFC 118. Therefore, the image data represents the image of the entire surface of the original 104 in a normal state without any lost part.

Figure 10:
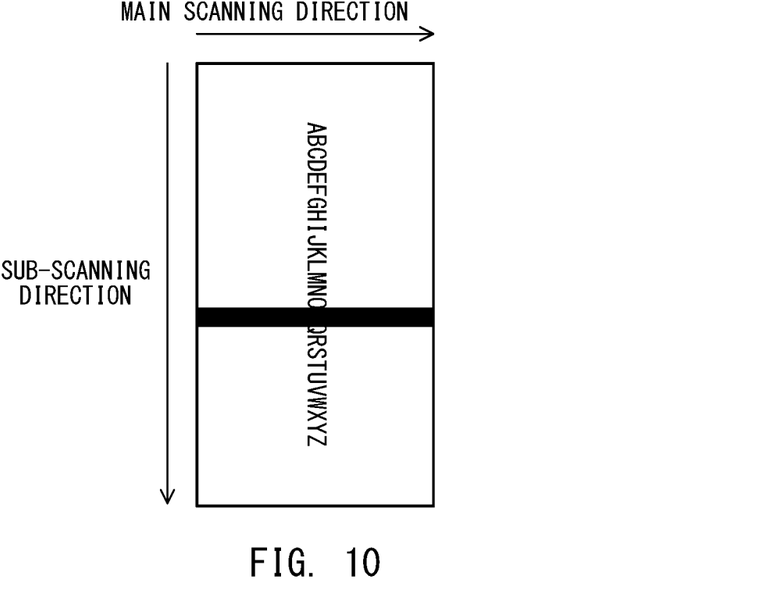
FIG. 10 is a view for illustrating an example of the image represented by the image data.

FIG. 10 is a view for illustrating an example of the image represented by the image data transmitted through the FFC 118 in which a break has occurred during the sliding. When a break has occurred in the signal line of the FFC 118 for transmitting the image data, the image data is not normally transmitted to the image control board 121. Therefore, the image data acquired by the image control board 121 does not include image data that is supposed to be acquired at a timing at which a break occurs during the sliding. The image data transmitted at the timing at which a break occurs during the sliding is not included, and hence an image failure occurs in the image represented by the image data acquired by the image control board 121.

While such PG data as described with reference to FIG. 5 to FIG. 8 is being output from the AFE 304, the image data (PG data) is constantly determined to be a predetermined value irrespective of the analog signal output from the image reading sensor 114. While reading the image of the original 104, the image reading sensor 114 outputs an analog signal of each pixel in synchronization with the main scanning synchronization signal. During this period, the AFE 304 is required to output image data obtained by digitally converting the analog signal, and therefore cannot output the PG data.

While the image reading unit 107 reads the image of the original 104, the FFC 118 slides in the housing 101. In addition, while the image reading unit 107 reads the image of the original 104, the image data stored in the memory 307 is changed depending on print information on the original 104, and hence the value cannot be identified. Therefore, the expected value of the value stored in the memory 307 is unknown, and hence the presence or absence of a break in the FFC 118 cannot be determined. That is, when a break occurs in the FFC 118 only during the sliding, it is difficult to detect the break in the FFC 118.

In view of this, in at least one embodiment, the connection state of the FFC 118 is constantly monitored through use of a loopback signal during the reading of the image of the original 104. This method of monitoring the connection state is a method of determining the presence or absence of a break in the FFC 118 by using two predetermined signal lines included in the FFC 118 to receive a loopback signal transmitted through one of the signal lines as it is by the other signal line. Therefore, the two signal lines are connected to each other on a side connected to the connector 119 of the image reading unit 107. For example, the CPU 301 monitors the connection state of the FFC 118 by transmitting and receiving a loopback signal through the signal lines at both ends of the FFC 118 in the width direction. The loopback signal is a predetermined DC voltage, and when a break has occurred in the FFC 118, the voltage value is extremely lowered. When the voltage value of the received loopback signal is lower than a predetermined threshold voltage, the loopback signal cannot be detected, and hence the CPU 301 can determine that a break has occurred in the FFC 118.

When the reading of the image of the original 104 is finished, the image reading unit 107 is returned from the trailing end of the original 104 to the vicinity of the leading end. At that time, the image reading unit 107 does not read an image. Therefore, during this period, the image reading processing is not affected even when the AFE 304 outputs the PG data. The FFC 118 slides in accordance with the movement of the image reading unit 107 in the same manner as during the reading of the image of the original 104, and operates in substantially the same manner as during the reading of the image. During this time period, the CPU 301 can detect a break in the sliding FFC 118 by monitoring the connection state of the FFC 118 using the PG data.

Figure 11:
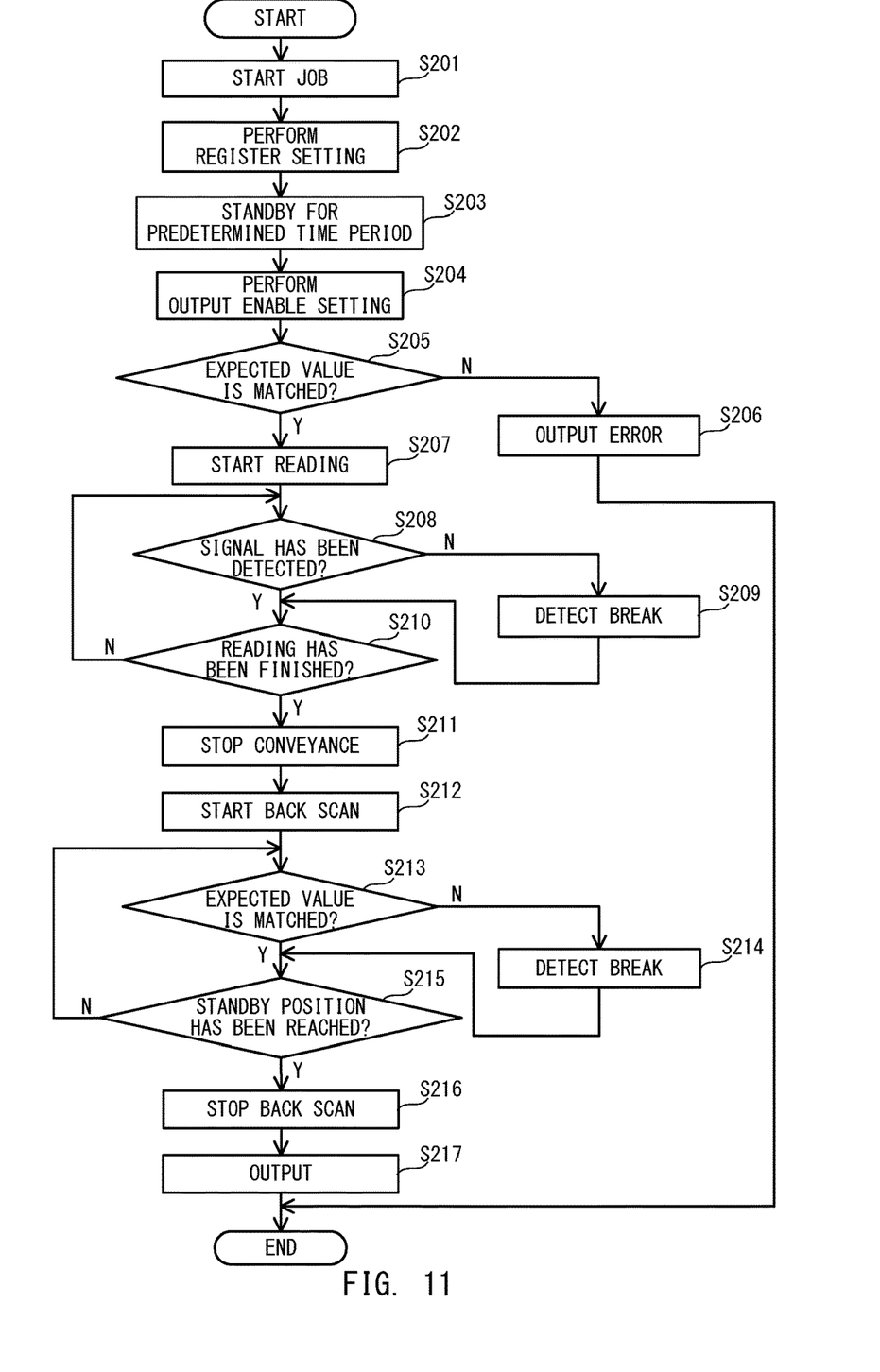
FIG. 11 is a flow chart for illustrating image reading processing.

FIG. 11 is a flow chart for illustrating the image reading processing involving processing for monitoring the connection state of the FFC 118. This processing includes processing before image reading, processing during the image reading, and processing after the image reading. The shading correction is performed during the processing before the image reading. When a shading error occurs, the flow chart indicating the failed part identification processing exemplified in FIG. 4 is performed, and the subsequent processing is not performed.

The CPU 301 performs a communication start setting for the image reading sensor 114, and compares the PG data output from the AFE 304 with the expected value before reading the image of the original 104. For this purpose, when acquiring a job start command for instructing to start image reading (Step S201), the CPU 301 performs various register settings on the image reading sensor 114 and the AFE 304 (Step S202). The settings performed in this case include a clock frequency setting, a cycle setting for a main scanning synchronization signal, an image data output setting, and a PG data setting. After the register settings, the CPU 301 stands by for a predetermined time period (Step S203), and performs an output enable setting for the image reading sensor 114 (Step S204). At this time point, the image reading unit 107 is in a stopped state without starting to read an image.

When output enable is set, the AFE 304 outputs PG data. The image processor 306 stores the PG data in the memory 307. The CPU 301 compares the data stored in the memory 307 with the expected value (Step S205). When the data stored in the memory 307 is different from the expected value ("N" in Step S205), the CPU 301 determines that a break has occurred in the FFC 118, and outputs an error (Step S206). In this case, the image reading apparatus 100 outputs the error without reading the image of the original 104, and brings the job to an end. The processing before the image reading is thus performed.

When the data stored in the memory 307 matches the expected value ("Y" in Step S205), the CPU 301 starts an operation during the image reading. The CPU 301 starts to convey the image reading unit 107 in the sub-scanning direction by the conveyance motor 116, and controls the image reading unit 107 to read an image (Step S207). The image reading unit 107 starts to read the image of the original 104. During a period of the image reading, the signal line of the FFC 118 for transmitting the image data is used for transmitting the image data. During this time period, the monitoring of the connection state of the FFC 118 using the PG data is not performed. Therefore, the CPU 301 uses a loopback signal to monitor the connection state of the FFC 118.

The CPU 301 determines whether or not a loopback signal has been detected (Step S208). When the loopback signal has not been detected ("N" in Step S208), the CPU 301 determines that a break has occurred in the FFC 118 (Step S209). When the loopback signal has been detected ("Y" in Step S208), the CPU 301 determines that no break has occurred in the FFC 118, and determines whether or not the reading of the image of the original 104 has been finished (Step S210). The CPU 301 determines whether or not the image reading has been finished based on whether or not the reading of the image of the trailing end of the original 104 has been finished. When the image reading has not been finished ("N" in Step S210), the CPU 301 continues to monitor the detection of the loopback signal. That is, the image reading apparatus 100 monitors the connection state of the FFC 118 through use of the loopback signal during the reading of the image of the original 104. When the image reading has been finished ("Y" in Step S210), the CPU 301 temporarily stops conveying the image reading unit 107 in the sub-scanning direction by the conveyance motor 116 (Step S211). The processing during the image reading is thus performed.

Subsequently, the CPU 301 starts the processing after the image reading. In preparation for the next job, the CPU 301 starts a back scan in which the conveyance motor 116 causes the image reading unit 107 to move to the vicinity of the leading end of the original 104 in a direction opposite to the conveyance direction at the time of the image reading (Step S212). During the back scan, the image reading unit 107 does not perform the image reading. Therefore, the CPU 301 examines the connection state of the FFC 118 through use of the PG data during the back scan. The FFC 118 slides during the back scan, and hence the CPU 301 can detect a break in the sliding FFC 118.

The AFE 304 outputs the PG data at the time of starting the back scan. The image processor 306 stores the PG data in the memory 307. The CPU 301 compares the data stored in the memory 307 with the expected value (Step S213). During the back scan, the data stored in the memory 307 is compared with the expected value for each line or for each plurality of lines. With this configuration, even when a break occurs in the FFC 118 only at a predetermined position during the sliding, it is possible to detect the break. When the data stored in the memory 307 is different from the expected value ("N" in Step S213), the CPU 301 determines that a break has occurred in the FFC 118 (Step S214). When the data stored in the memory 307 matches the expected value ("Y" in Step S213), the CPU 301 determines whether or not the image reading unit 107 has arrived at a standby position for the next job (Step S215). When the image reading unit 107 has not arrived at the standby position ("N" in Step S215), the CPU 301 continues to examine the connection state of the FFC 118 through use of the PG data. That is, the image reading apparatus 100 monitors the connection state of the FFC 118 through use of the PG data during the back scan.

When the image reading unit 107 has arrived at the standby position ("Y" in Step S215), the CPU 301 stops conveying the image reading unit 107 by the conveyance motor 116 (Step S216). The CPU 301 refers to results of detecting the connection state of the FFC 118 (that is, results of the processing of Step S208 and the processing of Step S213) to examine the presence or absence of a break in the FFC 118. The CPU 301 outputs the image data when no break has occurred in the FFC 118, and when a break has occurred in the FFC 118, outputs an error without outputting the image data (Step S217). This is because image data on such an image as exemplified in FIG. 10 is output when a break has occurred in the FFC 118. This brings the image reading processing to an end.

When the connection state of the FFC 118 is monitored through use of the loopback signal, the connection state of the signal line through which the loopback signal is transmitted is monitored, and hence it is impossible to directly know the connection state for the signal line through which the image data is transmitted. For example, even when a break has occurred in the signal line for transmitting the loopback signal, the image data can be transmitted as long as no break has occurred in the signal line for transmitting the image data. Therefore, when a break in the FFC 118 is detected in the processing of Step S208 and is not detected in the determination during the sliding in Step S213, the service person may be notified of a sign of a break in the FFC 118 and prompted to replace the FFC 118 in an early stage.

In the processing of Step S205 and Step S206 and the processing of Step S213 and Step S214, it is detected that a break has occurred in the signal line of the FFC 118 for transmitting the image data. In this case, it is preferred to output an error to prohibit the use of the image reading apparatus 100.

The image reading apparatus 100 described above can detect the connection state of the FFC 118 even when the image reading unit 107 is in operation. The image reading apparatus 100 can detect a break in the FFC 118 even when a break occurs in the FFC 118 only at a specific position during the sliding. Therefore, the image reading apparatus 100 can suppress deterioration in image quality due to a break in the FFC 118. As described above, according to the present disclosure, a failed part can be identified and quickly subjected to repair work, to thereby be able to shorten repair time compared to the related art.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-006645, filed Jan. 18, 2019 which is hereby incorporated by reference herein in its entirety.

What is claimed is:

1. An image reading apparatus, comprising:
   an image reading unit configured to read an image from an original to generate image data representing the read image;
   an image control unit configured to acquire the image data from the image reading unit; and
   a cable configured to connect the image reading unit and the image control unit to transmit the image data from the image reading unit to the image control unit and to supply power from the image control unit to the image reading unit,
   wherein the image reading unit includes:
      a light emitter configured to irradiate the original with light; and
      a light receiver configured to receive reflected light of the light from the original, to transmit the image data to the image control unit via the cable, wherein the image control unit includes:
  a controller configured to control an operation of the image reading unit;
  a memory configured to store the image data acquired from the image reading unit; and
  a monitor configured to perform monitoring, via the cable, of the power supplied from the image control unit to the image reading unit,
wherein, when there occurs an error, which indicates that the operation of the image reading unit is unable to be appropriately operated, the controller is configured to determine a failed part to be replaced that has caused the error by:
  first determining whether a power supply voltage is being normally supplied to the image reading unit based on the result of the monitoring performed by the monitor;
  second determining whether the light emitter is normally emitting light;
  third determining whether the memory is normally operating; and
  fourth determining whether data output from the image reading unit is normally stored in the memory,
wherein the second, third and fourth determining are performed in a case where it is determined that the power supply voltage is being normally supplied in the first determining.

2. The image reading apparatus according to claim 1, further comprising a white reference plate serving as a white reference,
wherein the controller is configured to:
  perform shading correction based on a result of reading the white reference plate by the image reading unit, and when determining that it is difficult to correct the read image by the shading correction; and
  determine that the error has occurred.

3. The image reading apparatus according to claim 1, wherein the image control unit further includes:
  a voltage generation unit configured to supply the power supply voltage to the image reading unit; and
wherein the monitor is configured to perform monitoring of a voltage value of the power supply voltage, and
wherein the controller is configured to determine, based on a result of the monitoring performed by the monitor, whether the power supply voltage is being supplied to the image reading unit at a normal voltage level.

4. The image reading apparatus according to claim 3, wherein the monitor is configured to compare the power supply voltage with a predetermined voltage level serving as a reference, and
wherein the controller is configured to determine, based on a result of the comparison, whether the power supply voltage is at the normal voltage level.

5. The image reading apparatus according to claim 1, wherein the image reading unit is configured to supply a current to the light emitter, to thereby perform light emission control on the light emitter, and
wherein the controller is configured to determine, based on a state in which the current is being supplied to the light emitter, whether the light emitter is normally emitting light.

6. The image reading apparatus according to claim 1, wherein the controller is configured to write the data to the memory, then read the data from the memory, and verify a match between the written data and the read data, to thereby determine whether the memory is normally operating.

7. The image reading apparatus according to claim 1, wherein the image reading unit is configured to store predetermined data at a specific address of the memory, and
wherein the controller is configured to determine whether the data output from the image reading unit is normally stored in the memory based on whether the predetermined data stored at the specific address of the memory matches an expected value.

8. The image reading apparatus according to claim 7, wherein the image reading unit is configured to store, as the predetermined data, a fixed value at the specific address of the memory.

9. The image reading apparatus according to claim 7, wherein the image reading unit is configured to store, as the predetermined data, a value incremented by one for each pixel at the specific address of the memory.

10. The image reading apparatus according to claim 1, wherein the image control unit is implemented on a first board,
wherein the image reading unit is implemented on a second board,
wherein the light emitter is implemented on a third board, and
wherein the controller is configured to:
  determine that the first board has failed, when the power supply voltage is not being normally supplied to the image reading unit and when the memory is not normally operating;
  determine that one of the second board and the third board has failed, when the light emitter is not normally emitting light; and
  determine that one of the first board and the second board has failed, when the data output from the image reading unit is not normally stored in the memory.

11. The image reading apparatus according to claim 1, further comprising
a cable including a plurality of signal lines configured to electrically connect the image control unit and the image reading unit to each other,
wherein the controller is configured to:
  determine, during a period in which the image reading unit is reading the image, a connection state of the cable by receiving data, which is transmitted through one of predetermined two signal lines among the plurality of signal lines of the cable, by another one of the predetermined two signal lines; and
  determine, during a period in which the image reading unit is not reading the image, the connection state of the cable by the fourth determining whether data output from the image reading unit through the cable is normally stored in the memory.

12. The image reading apparatus according to claim 11, wherein the one of the predetermined two signal lines and the another one of the predetermined two signal lines are connected to each other on a side thereof connected to the image reading unit, and
wherein the controller is configured to determine the connection state of the cable by looping data transmitted through the one of the predetermined two signal lines and receiving the looped data by the another one of the predetermined two signal lines.

13. The image reading apparatus according to claim 11, wherein the controller is configured to determine the connection state of the cable by receiving data, which is transmitted through the one of the predetermined two signal lines at both ends of the cable in a width direction of the cable, by the another one of the predetermined two signal lines.

14. The image reading apparatus according to claim 11,
   wherein the image reading unit is configured to store predetermined data at a specific address of the memory through the cable, and
   wherein the controller is configured to determine whether data transmitted from the image reading unit through the cable is normally stored in the memory based on whether the predetermined data stored at the specific address of the memory matches an expected value.

15. The image reading apparatus according to claim 14, wherein the image reading unit is configured to store, as the predetermined data, a fixed value at the specific address of the memory.

16. The image reading apparatus according to claim 14, wherein the image reading unit is configured to store, as the predetermined data, a value incremented by one for each pixel at the specific address of the memory.

* * * * *